United States Patent
Murphy

(10) Patent No.: US 6,717,509 B1
(45) Date of Patent: Apr. 6, 2004

(54) METHOD FOR SENDING MESSAGE THAT INDICATES POSITION AND MESSAGE TRANSMISSION DEVICE AND MESSAGE TRANSMISSION SERVER

(75) Inventor: Michael D. Murphy, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/431,675

(22) Filed: Nov. 1, 1999

(51) Int. Cl.[7] ................................................. G01V 3/00
(52) U.S. Cl. ...................... 340/10.1; 340/988; 340/991; 340/992; 340/994; 340/995
(58) Field of Search ................................ 340/995, 991, 340/988, 992, 994, 10.4; 701/207; 455/456; 375/132

(56) References Cited

U.S. PATENT DOCUMENTS 5,528,248 A 6/1996 Steiner et al. ............... 342/357
6,198,390 B1 * 3/2001 Schlager et al. ............ 340/540

* cited by examiner

Primary Examiner—Daryl Pope
(74) Attorney, Agent, or Firm—Wagner, Murabito, & Hao LLP

(57) ABSTRACT

A method and system for sending messages that indicate position. In one embodiment, the message transmission device includes a message transmission unit that is coupled to a position determination system. A server is adapted to receive messages from the message transmission device. In operation, a first message is generated at the message transmission device. The position of the message transmission device is determined and is included in the message. The message is then sent to the server. The server then generates a second message that complies with any instruction indicated in the first message that relates to position. An instruction that relates to position can indicate routing, format, performance of a task, etc. By indicating return routing in the instruction, a user can obtain location in any of a number of desired formats without the need to store extensive databases in the message transmission device. In a second embodiment of the present invention, a message transmission device is used that does not include PDS processing capabilities. PDS data is received and is transmitted to the server, along with an indication of the time that the PDS data is received. The server then determines the position of the message transmission device and sends a second message that indicates the position of the message transmission device.

32 Claims, 8 Drawing Sheets

EXEMPLARY INSTRUCTIONS

| | |
|---|---|
| 801 | SEND RETURN MESSAGE TO SENDER THAT INCLUDES DETERMINATION OF POSITION IN ECEF COORDINATES |
| 802 | SEND RETURN MESSAGE TO SENDER THAT INCLUDES DETERMINATION OF POSITION AS STREET AND NEAREST CROSS STREET |
| 803 | SEND RETURN MESSAGE TO SENDER THAT INCLUDES DETERMINATION OF POSITION AS STREET ADDRESS |
| 804 | SEND RETURN MESSAGE TO SENDER THAT INCLUDES DETERMINATION OF POSITION IN LATITUDE AND LONGITUDE |
| 805 | SEND RETURN MESSAGE TO SENDER THAT INCLUDES DETERMINATION OF POSITION IN MAP COORDINATES |
| 806 | SEND MESSAGE TO ADDRESSEE THAT INCLUDES DETERMINATION OF POSITION IN LATITUDE AND LONGITUDE |
| 807 | SEND MESSAGE TO ADDRESSEE THAT INCLUDES DETERMINATION OF POSITION AS STREET AND NEAREST CROSS STREET |
| 808 | SEND MESSAGE TO ADDRESSEE THAT INCLUDES DETERMINATION OF POSITION AS STREET ADDRESS |
| 809 | SEND MESSAGE TO ADDRESSEE THAT INCLUDES DETERMINATION OF POSITION IN WGS84 COORDINATES |
| 810 | SEND MESSAGE TO ADDRESSEE THAT INCLUDES DETERMINATION OF POSITION IN MAP COORDINATES |
| 811 | SEND MESSAGE TO SERVICE PROVIDER THAT INDICATES SENDER'S POSITION-AUTOMATED ROUTING TO SERVICE PROVIDER'S FACILITY THAT IS NEAREST TO SENDER'S POSITION |
| 812 | SEND FORMATTED MESSAGE THAT INDICATES POSITION |
| 813 | SEND FORMATTED MESSAGE TO SERVICE PROVIDER THAT INDICATES SENDER'S POSITION-AUTOMATED ROUTING TO SERVICE PROVIDER'S FACILITY THAT IS NEAREST TO SENDER'S POSITION |
| 814 | SEND RETURN MESSAGE THAT IS RESPONSIVE TO QUERY |
| 815 | SEND MESSAGE THAT INSTRUCTS THAT A TASK IS TO BE PERFORMED THAT RELATES TO POSITION |
| 816 | SEND MESSAGE TO AUTOMATED DEVICE INSTRUCTING PERFORMANCE OF TASK WHEN DETERMINED POSITION MEETS CRITERIA |
| 817 | SEND MESSAGE TO AUTOMATED GATE OPENING DEVICE INSTRUCTING THAT GATE BE OPENED WHEN DETERMINED POSITION IS NEAR GATE |
| 818 | SEND MESSAGE TO ALARM SYSTEM INSTRUCTING THAT THE ALARM SYSTEM BE DEACTIVATED WHEN THE DETERMINED POSITION IS NEAR THE ALARM SYSTEM |
| 819 | SEND MESSAGE AND ROUTE MESSAGE ACCORDING TO ADDRESSEE AND ACCORDING TO DETERMINATION OF POSITION |

FIG. 8

METHOD FOR SENDING MESSAGE THAT INDICATES POSITION AND MESSAGE TRANSMISSION DEVICE AND MESSAGE TRANSMISSION SERVER

TECHNICAL FIELD

The present invention generally pertains to the field of communication devices and methods for determining position. More particularly, the present invention is related to communication of position.

BACKGROUND ART

Position Determination System (PDS) devices such as devices that determine position using the satellites of the US Global Positioning System typically include a GPS antenna, a GPS receiver, a GPS processor, and a data storage device. Signals from the GPS are received by the GPS antenna, processed by the GPS receiver and position is determined by the GPS processor. However, typically, the computation of position using signals from the GPS system gives position in an Earth Centered Earth Fixed (ECEF) format that includes ECEF coordinates.

The indication of position in ECEF coordinates is not particularly useful for most applications. Maritime users, campers, hikers, and other users in remote locations typically want to know their position in terms of latitude and longitude. Users in urban areas typically want to know their position as a street address. Alternatively, users desire to know position relative to major landmarks, or relative to nearby cross streets.

The conversion of position into other coordinate systems requires that conversion algorithms and/or extensive databases be stored in the PDS device. This requires a high capacity memory storage device. High capacity memory storage devices sufficient to store the large databases and conversion algorithms are quite expensive. Also, usage is complicated by the fact that new streets, addresses, and landmarks are constantly being added and existing streets, addresses and landmarks are frequently changed. Therefore, the databases used must be frequently updated. The updating process is expensive and time consuming. In addition, the microprocessor must be quick and powerful to search the database and convert the determined position into the desired reference system in a timely manner. This adds even more expense to the PDS device.

As usage of the GPS has grown in popularity, there has been a need for economical devices that allow for the determination of the position of the user. However, GPS processors are expensive as are memory storage devices. In addition, maintenance of devices for determining position that indicated position in different formats is expensive and difficult due to the need to frequently update the stored databases.

Recently, message transmission devices that allow persons to easily send messages have become popular. These message transmission devices include computers, handheld computers, digital telephones and digital pagers. The communication systems that are used by recent message transmission devices include, for example, the internet, cellular telephone networks, paging networks, wireless data transmission networks, telephone transmission lines and cable systems.

Typically, message transmission devices include a keypad that allows a user to compose a message. Many message transmission devices use commonly available software programs such as Eudora, Netscape Navigator, etc. that generate messages conforming to a standard format. A typical message contains a body and one or more headers. The headers indicate the final destination to which the message is to be sent and the identity of the sender.

One commonly used format for messages is the Standard Mail Transmission Protocol (SMTP) format. The SMTP format is used for almost all internet message transmissions. Due to the popularity and widespread use of the SMTP format for internet transmission, the SMTP format is also being increasingly used for non-internet communications.

Servers are used to route messages to their final destination. Servers that route messages that conform to the SMTP format (SMTP servers) route messages based on information contained in a header. Typically, such servers only route messages, they do not alter the text in the body of the message. Instead, headers are often added, deleted, or otherwise altered by the server to route the message to the desired final destination.

Because of the relatively high cost of adding position determination capabilities to message transmission devices, these devices do not typically include position determination capabilities. However, it is often desirable for a user of a message transmission device to know his position. In addition, the user's position is often needed to properly route a message. This is particularly true when a user of a message transmission device needs to contact or locate the nearest facility of a service provider such as, for example, the nearest gas station, the nearest bank branch, etc.

What is needed is a way for a user of a message transmission device to determine position and to indicate position in a message. In addition, a way to determine position is needed that couples position to a user in a desired format, without the need to store and update extensive databases on the device being used. Still another need exists for a device that meets the above-listed needs and that is inexpensive. Yet another need exists for a method and apparatus for routing of messages according to the position of the sender. The present invention provides a solution to the above needs.

DISCLOSURE OF THE INVENTION

The method and apparatus of the present invention allows for inexpensively indicating position in a message. In addition, the method and apparatus of the present invention provides for an apparatus that can be used to determine position that is inexpensive to manufacture. Also, the method and apparatus allows for the indication of position in a desired format, without the need to store and update extensive databases on the device being used to generate the message. Also, the method and apparatus of the present invention allows for routing of messages based on the position of the sender.

A message transmission device is described that is adapted to send and receive messages. In one embodiment, the message transmission device includes a message transmission unit that is coupled to a position determination system. The message transmission unit can employ any of a number of known methods for sending and receiving messages, and can include, for example, a radio modem, a pager, a telephone modem, etc. In one embodiment, the message transmission unit is a digital pager that includes alphanumeric input keys for data input. Alternatively, the message transmission unit includes a computer that is coupled to a radio modem that is adapted to communicate through a cellular communication system.

A server is described that is adapted to send and receive messages. The server is adapted to receive messages from the message transmission device and perform instructions that relate to position indicated in received messages. In one embodiment, the server is coupled to the internet and is adapted to receive messages formatted in Standard Mail Transmission Protocol (SMTP) format. In such an embodiment, messages are coupled over a communication system such as a cellular communication system, paging network, etc. to the server. The server then generates and sends a message that complies with the indicated instruction.

In one embodiment, instructions indicate routing. Examples of indications of routing include return routing, automated routing, and routing to addressee. When return routing is indicated, a message that complies with the indicated instruction is routed back to the message transmission device. Automated routing allows for routing that is dependent on the position of the message transmission device.

In one embodiment, instructions also indicate the format in which the position information is to be indicated. That is, the position information is indicated in the indicated formats. Formats include, for example, Earth Centered Earth Fixed (ECEF) coordinates, World Geodetic Survey 84 (WGS 84) coordinates, map coordinates, Latitude and Longitude coordinates, street address, street and nearest cross street, etc.

By indicating return routing in the instruction, a user can obtain location in any of a number of desired formats without the need to store extensive databases in the message transmission unit. Instead, databases necessary for conversion of position into the various formats are centrally located on the server. Because a single server can service many message transmission units, database maintenance and updating is facilitated. The message transmission device of the present invention is less expensive than prior art devices that are capable of determining position in a particular format because each message transmission device does not have to include databases and conversion programs for converting position into a desired format as are required by prior art devices.

In one embodiment of the present invention, a message transmission device is disclosed that does not include a PDS processing capabilities. In this embodiment, the message transmission device includes a PDS antenna and PDS receiver, but does not include a PDS processor. Instead of processing PDS data at the message transmission device, in this embodiment, PDS data is processed at the server. More particularly, in one embodiment, PDS data is received at the message transmission device and is transmitted to the server, along with an indication of the time that the PDS data is received. The server then determines the position of the message transmission device and sends a return message to the message transmission device that indicates the position of the message transmission device. This allows for the determination of position using a message transmission device that is less expensive than prior art devices for determining position. More particularly, significant cost savings are realized by eliminating the PDS processor. Also, extensive databases for converting position into a desired format are not required as are required by prior art systems for determining position in a given format.

The present method and apparatus allows a user of a message transmission device to determine position and to indicate position in a message. In addition, the method and apparatus of the present invention provides a way to determine position in a desired format, without the need to store and update extensive databases on the device being used. In addition, the present invention meets the above-listed needs and is inexpensive as well. Moreover, the apparatus and method of the present invention allows for routing of messages according to the position of the sender.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 is a diagram illustrating exemplary instructions in accordance with one embodiment of the present claimed invention.

Figure 1:
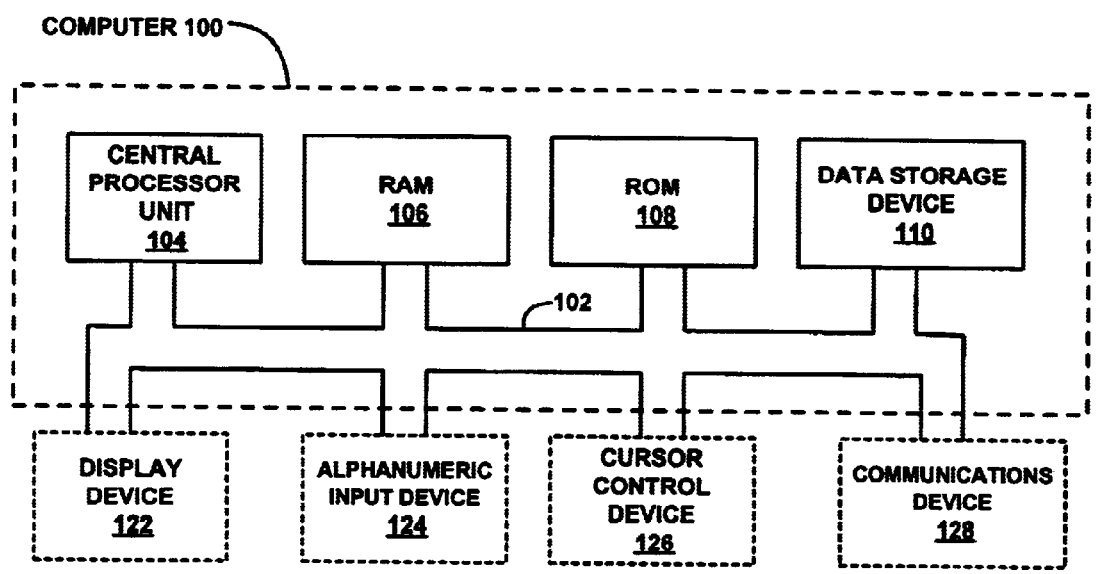
FIG. 1 is a schematic diagram of an exemplary computer system used to perform steps of the present invention in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "receiving," "sending," "determining," "inserting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the present method for sending a message that indicates position and system are comprised of computer-readable and computer-executable instructions that reside, for example, in computer-usable media of a computer system. FIG. 1 illustrates an exemplary computer system 100 used to perform the method of sending a message that indicates position in accordance with one embodiment of the present invention. It is appreciated that system 100 of FIG. 1 is exemplary only and that the present invention can operate within a number of different computer systems including general purpose networked computer systems, embedded computer systems, and stand-alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 124 including alphanumeric and function keys that is coupled to bus 102 for communicating information and command selections to central processor unit 104. System 100 also optionally includes a cursor control device 126 coupled to bus 102 for communicating user input information and command selections to central processor unit 104. System 100 of the present embodiment also includes an optional display device 122 coupled to bus 102 for displaying information.

Referring still to FIG. 1, optional display device 122 of FIG. 1, may be a liquid crystal device, cathode ray tube, or other display device suitable for creating graphic images and alphanumeric characters recognizable to a user. Optional cursor control device 126 allows the computer user to dynamically signal the two dimensional movement of a visible symbol (cursor) on a display screen of display device 122. Many implementations of cursor control device 126 are known in the art including a trackball, mouse, touch pad, joystick or special keys on alphanumeric input device 124 capable of signaling movement of a given direction or manner of displacement. Alternatively, it will be appreciated that a cursor can be directed and/or activated via input from alphanumeric input device 124 using special keys and key sequence commands. The present invention is also well suited to directing a cursor by other means such as, for example, voice commands. A more detailed discussion of the interrupt optimization method and system embodiments of the present invention are found below.

With reference still to FIG. 1, significantly, a communication device 128, coupled to bus 102, is used for transmitting and receiving data. In one embodiment, communication device 128 is a radio modem. Alternatively, communication device 128 can be a telephone modem, a network interface card, a radio transceiver, a radio transmitter and receiver, etc. A more detailed discussion of embodiments of communication device 128 are given below.

Figure 2:
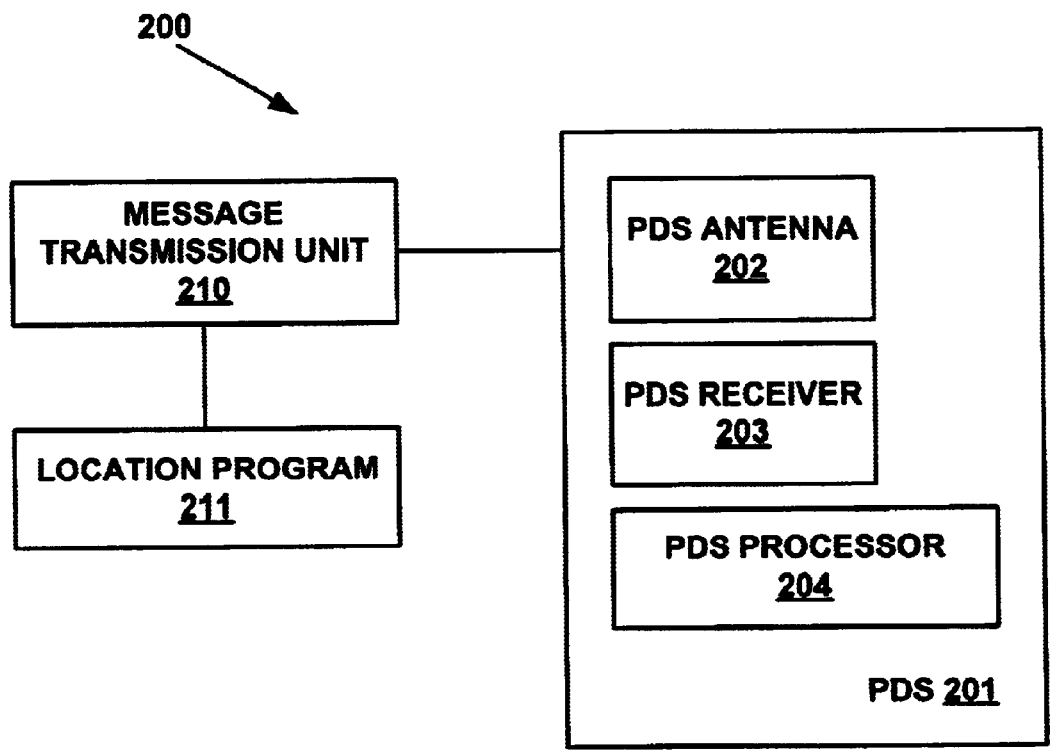
FIG. 2 is a schematic diagram of a message transmission device in accordance with one embodiment of the present invention.

Referring next to FIG. 2, message transmission device 200 includes a message transmission unit 210 that is coupled to a Position Determination System (PDS) 201. PDS 201 is shown to include a PDS antenna 202, a PDS receiver 203, and a PDS processor 204.

In one specific embodiment, PDS processor 204 is a GPS processor made by Trimble Navigation, Ltd. of Sunnyvale, Calif. In this embodiment, PDS antenna 202 is an ACE II GPS™ antenna, manufactured by Trimble Navigation, Ltd. and PDS receiver 203 includes a SIERRA GPS chipset, manufactured by Trimble Navigation, Ltd™. Although such a specific implementation is described, the present invention is also well suited to an embodiment having various other components and features.

In one embodiment, PDS 201 is adapted to determine position using a Satellite Positioning System such as the U.S. Global Positioning System (GPS). In the present embodiment, reference to a position determination system herein refers to a Global Positioning System (GPS), to a Global Orbiting Satellite System (GLONASS), and to any other positioning system, including pseudolites and dead reckoning systems, that provides information by which an observer's position can be determined. The term "position determination system" and "PDS" as used herein, is intended to include pseudolite or equivalents of pseudolites, and the term "position determination system signals" and "PDS signals," as used herein, is intended to include position determination system-like signals and data from pseudolites or equivalents of pseudolites. Also, signals from other sources such as LORAN, Wide Area Augmentation System (WAAS) satellites, etc. may be used to determine position. The position determination system may also provide information by which an observer's velocity and/or the time of observation can be determined.

In one embodiment, location program 211 of FIG. 2 is a software program operable on message transmission unit 210 for performing steps of the present invention. Alternatively, the functions of location program 211 can be implemented as executable instructions in PDS processor 201 or on the processor of message transmission unit 210. Alternatively, the functions of location program 211 can be implemented on a Application Specific Integrated Circuit (ASIC) device, or a Field Programmable Gate Array (FPGA) integrated circuit device, or other device capable of executing a series of instructions.

Figure 3:
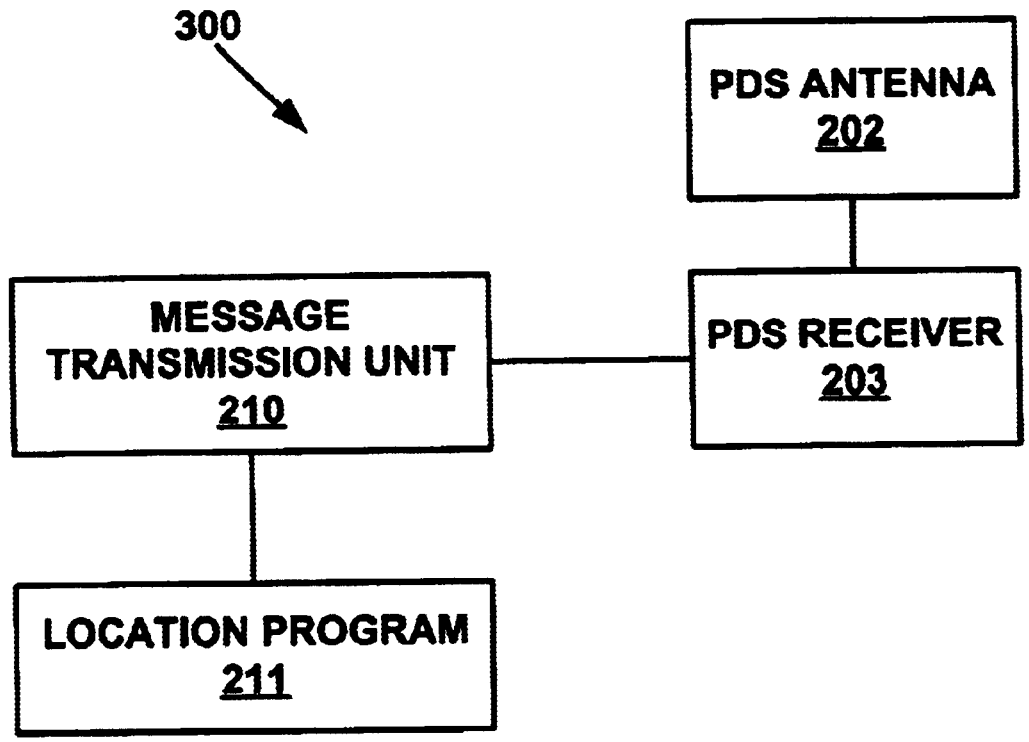
FIG. 3 is a schematic diagram of a message transmission device that does not include PDS processing capabilities in accordance with one embodiment of the present claimed invention.

System 300 of FIG. 3 shows an alternate embodiment that does not include PDS processing capabilities. System 300 is shown to include PDS antenna 302 and PDS receiver 303. System 300 does not include a PDS processor 304 as is shown in FIG. 2. In the embodiment shown in FIG. 3, significant cost savings are realized by eliminating GPS processor 304.

In one embodiment, message transmission unit 210 of FIGS. 2–3 is a computer such as computer 100 of FIG. 1. Alternatively, message transmission unit is a special purpose device that is adapted to send and receive messages such as, for example, a digital pager, a digital telephone, etc.

In one embodiment, message transmission unit 210 of FIGS. 2–3 includes a processor on which a host operating program operates. A messaging program operates in conjunction with the host operating program for sending and receiving messages. In one embodiment, the host operating program is a Windows 95, Windows 98, Windows NT, or Windows CE software program by Microsoft Corporation of Redmond, Washington. The messaging program can be any program adapted to send a message such as, for example, Eudora, Eudora Light, Internet Explorer, Netscape Navigator, etc. that is adapted to send messages in a SMTP format. Alternatively, a messaging program that is adapted to send messages in other formats, such as, for example, a digital paging format or a digital telephone format, could also be used.

Figure 4:
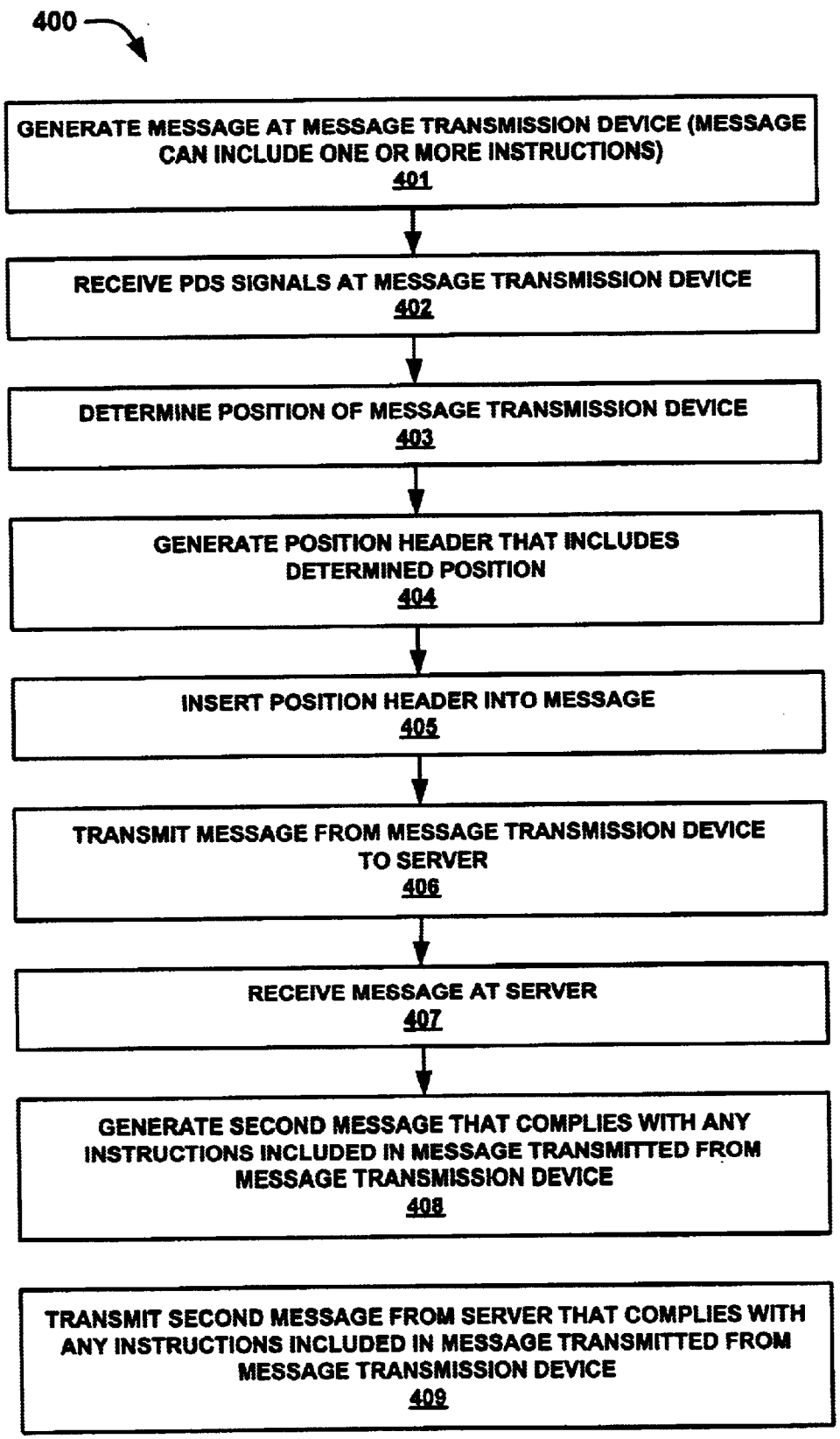
FIG. 4 is a flow chart of steps performed in one implementation of a method for sending a message that indicates position in accordance with one embodiment of the present claimed invention.
Figure 6:
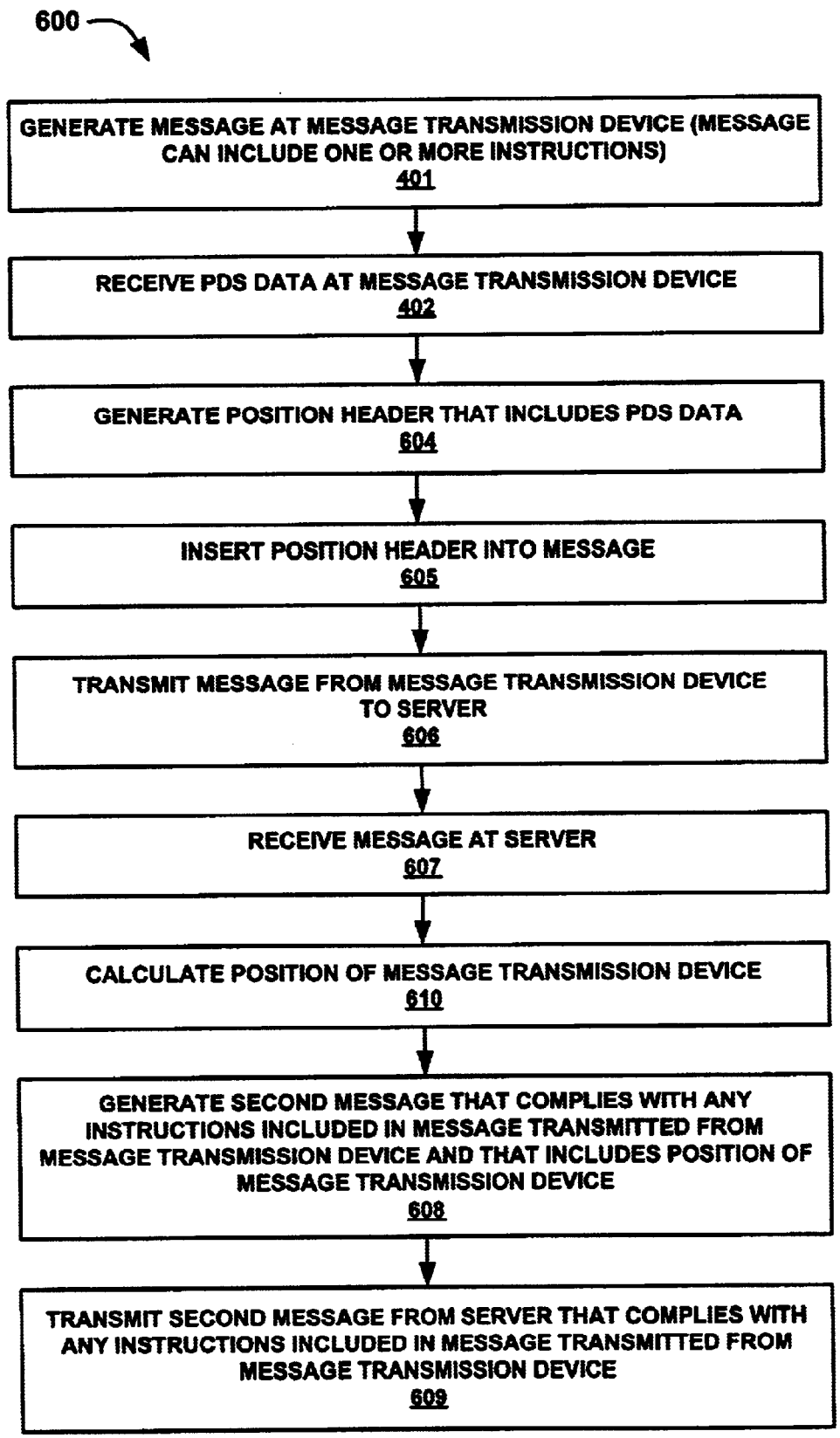
FIG. 6 is a flow chart of steps performed in one implementation of a method for sending a message that indicates position in accordance with one embodiment of the present claimed invention.

With reference next to FIGS. 4 and 6, flow charts 400 and 600 show exemplary steps used by the present invention. Flow charts 400 and 600 include processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. In one embodiment, location program 211 of FIGS. 2–3 includes computer-executable instructions. The computer-readable and computer-executable instructions are used to control or operate in conjunction with, for example, central processing unit 104 of FIG. 1, and PDS 201 of FIG. 2. Although specific steps are disclosed in flow charts 400 and 600, such steps are exemplary. That is, the present invention is well suited to performing various other steps or variations of the steps recited in FIGS. 4 and 6.

In the following description of embodiments of the present invention, messages are described as being formatted into the SMTP format. The SMTP format is widely used for sending and receiving messages over the internet. Although the present embodiments specifically recite the use of SMTP formatted message, the present invention is also well suited to embodiments employing various other message formats. That is, the present invention is well suited to an embodiment in which the message is formatted in, for example, a digital paging format and/or a digital telephone format and any other program adapted for sending and receiving messages.

In the following description of embodiments of the present invention, the PDS is described as using satellites of the GPS for determining position. Although the present embodiments specifically recite the use of the satellites of the GPS, the present invention is also well suited to an embodiment using various other position determining systems. That is, the present invention is well suited to an embodiment in which the PDS uses Pseudolites, GLONASS, etc. for determining position.

Flow chart 400 of FIG. 4 shows a method for sending a message that indicates position in accordance with one embodiment of the present invention. As shown in step 401, a message is generated at a message transmission device. In the embodiments shown in FIGS. 2–3, message transmission unit 210 is used to generate a message. In one embodiment, alphanumeric input device 124 and/or cursor control device 126 of FIG. 1 are used to generate a message using a messaging program (not shown) that is operable on central processor unit 104. The message can include one or more instructions that relate to position. In one embodiment, instructions are indicated in the body of the message by an asterisk on each side of the instruction such as, for example, the instruction *gas?*.

As shown by step 402, PDS signals are received. In the embodiments shown in FIGS. 2–3, PDS signals are received by PDS antenna 202 and are demodulated by PDS receiver 203 to obtain PDS data. In an embodiment where PDS antenna 202 and PDS receiver are a GPS antenna and a GPS receiver, respectively, signals from satellites of the GPS are received, down converted and demodulated.

Referring now to step 403 of FIG. 4, position is determined. In the embodiment shown in FIG. 2, position is determined by PDS processor 204. In one embodiment, the determined position is expressed in Latitude and Longitude coordinates.

Continuing with FIG. 4, a header is then generated as shown by step 404 that includes the determined position (hereinafter the "position header"). In the embodiment shown in FIG. 2, location program 211 is operable to obtain the determined position from PDS processor 204 and to generate a position header.

As shown by step 405 of FIG. 4, the position header is then inserted into the message. In one embodiment, the position header that is generated in step 403 is inserted into the message as a header. In an embodiment where a messaging program is operating in the message transmission unit, location program 211 of FIG. 2 is operable to insert the position header into the message. That is, the message will contain an additional header that indicates position.

The message is then transmitted as shown by step 406. In the embodiment shown in FIG. 2, the message is transmitted by message transmission unit 210. In an embodiment where a computer such as computer 100 of FIG. 1 is used, communications device 128 is used to transmit the message.

Referring now to step 407, the message transmitted in step 406 is received at a server. In one embodiment, a server is used that is a computer such as computer 100 of FIG. 1. In such an embodiment, the message is received via communication device 128. In one embodiment, the received message is stored in RAM 106.

As shown by step 408 of FIG. 4, the server then generates a message that complies with any instructions included in the message received in step 407 and that indicates the position determined in step 403 (hereinafter the "second message"). The indication of the position determined in step 403 can be in a format indicated by any instruction included in the message received in step 407. That is, for example, if an instruction is received indicating that position is to be inserted into the body of the message as a street address, the determined position is indicated in the body of the message as the street address of the determined position.

As shown in step 409 of FIG. 4, the second message is then transmitted by the server. The transmission of the second message complies with any instruction received in step 405. Thus, for example, if an instruction is received indicating a particular routing, the message is routed pursuant to the indicated routing.

Figure 5:
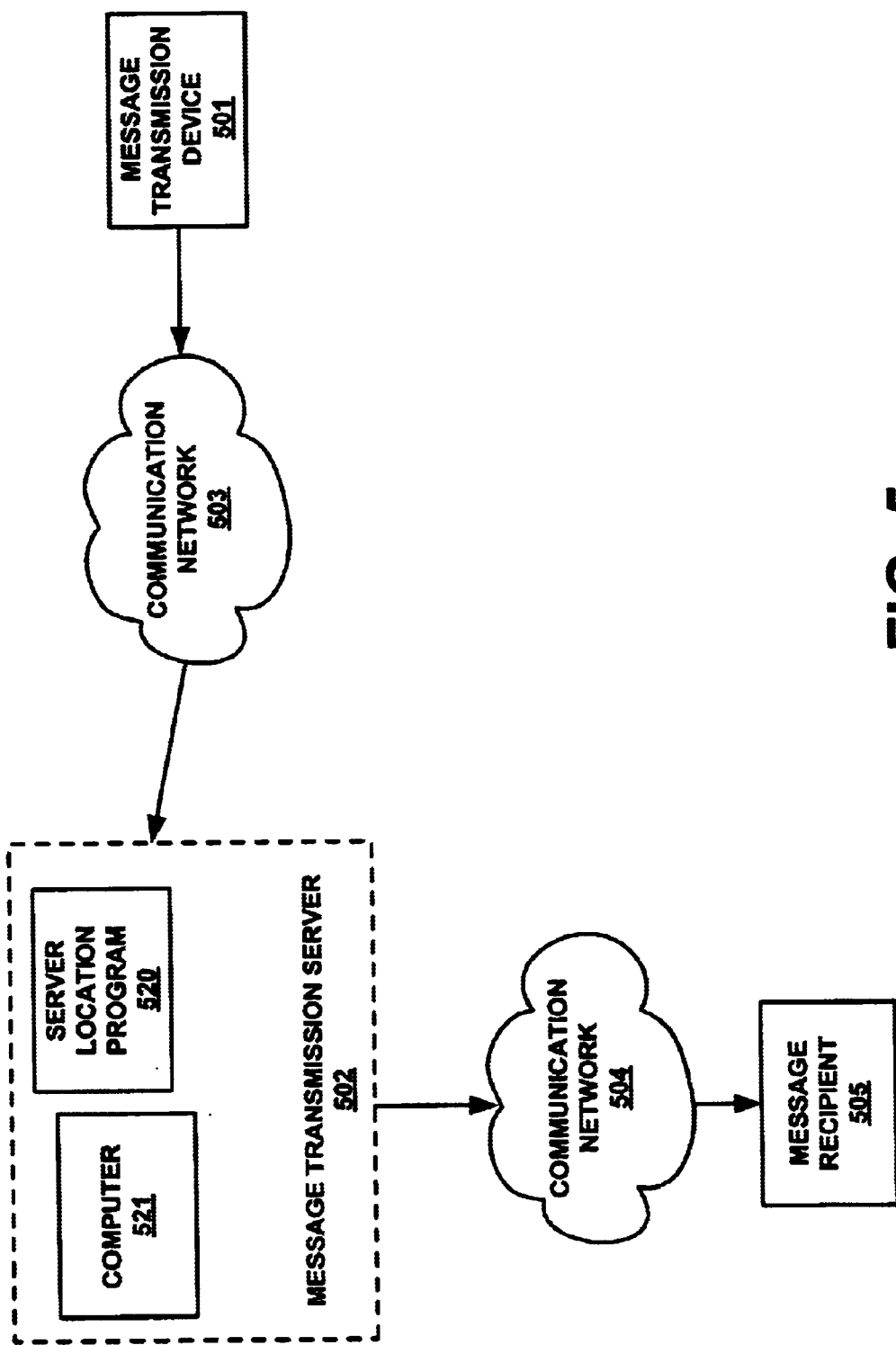
FIG. 5 is a diagram illustrating the transmission of a message that indicates position from a message transmission device to a message recipient in accordance with one embodiment of the present claimed invention.

FIG. 5 illustrates an exemplary embodiment for transmitting a message from a message transmission system 501 to a message recipient 505, using a message transmission server 502. In one embodiment, message transmission server 502 includes a computer system 521 that is identical to computer system 100 of FIG. 1 and that is adapted to route messages formatted in the SMTP format. Server location program 520 is operable on computer 521 for performing steps of the present invention. In one embodiment, message transmission server 502 also includes a commercially available SMTP routing program (not shown) that operates in conjunction with server location program 520 for routing SMTP formatted messages.

Message transmission server 502 and message transmission system 501 are coupled via communication network 503. In one embodiment, communication network 503 includes a paging network. Alternatively, communication network 503 includes a radio transmission network such as a cellular telephone network, conventional land lines, a fiber optic lines, and/or other transmission networks, either solely or in combination with one or more of the above listed communication networks.

Continuing with FIG. 5, message transmission server 502 and message recipient 505 are coupled via communication network 504. Communication network 504 can be identical to communication network 503 or may be an entirely different network.

In operation, when the embodiment shown in FIG. 5 is used to send a message from a message transmission system 501 to a message recipient 505, using the method described in flow chart 400 of FIG. 4, message transmission system 501 is used to generate a message as shown in steps 401–406 of FIG. 4. The message is routed to message transmission server 502 via communication network 503. Message transmission server 502 then performs the instruction indicated by the received message. For example, when the instruction indicates that position is to be indicated in a particular format in the body of the message, server location program 520 determines position in the desired format using the data included in the position header. A second message is generated by server location program that includes the determined position in the desired format. The second message is then transmitted, via communication network 504 to message recipient 505.

Flow chart 600 of FIG. 6 shows an alternate embodiment for transmitting a message that indicates position. As shown by step 401, a message is generated at a message transmission device. As shown in step 401, a message is generated at a message transmission device. In the embodiments shown in FIGS. 2–3, message transmission unit 210 is used to generate a message. In one embodiment, alphanumeric input device 124 and/or cursor. control device 126 of FIG. 1 are used to generate a message using a messaging program (not shown) that is operable on central processor unit 104.

As shown by step 402, PDS data is received. In the embodiments shown in FIGS. 2–3, PDS signals are received by PDS antenna 202 and are demodulated by PDS receiver 203 to obtain PDS data. In an embodiment where PDS antenna 202 and PDS receiver are a GPS antenna and a GPS receiver, respectively, signals from satellites of the GPS are received, down converted and demodulated.

Continuing with FIG. 6, as shown by step 604, a header is generated that includes the PDS data (hereinafter the "position header"). In the embodiment shown in FIG. 3, location program 211 is operable to obtain the PDS data from PDS receiver 203 and to generate a position header. In one embodiment, the position header includes raw PDS data along with an indication of the time that the raw data was received.

As shown by step 605 of FIG. 6, the position header is then inserted into the message. In one embodiment, the position header that is generated in step 604 is inserted into the message as a header. In an embodiment where a messaging program is operating in the message transmission unit, location program 211 of FIG. 3 is operable to insert the position header into the message. That is, the message will contain an additional header that indicates position.

The message is then transmitted as shown by step 606. In the embodiment shown in FIG. 3, the message is transmitted by message transmission unit 210. In an embodiment where a computer such as computer 100 of FIG. 1 is used, communications device 128 is used to transmit the message.

Referring now to step 607, the message transmitted in step 606 is received at a server. In one embodiment, a server is used that is a computer such as computer 100 of FIG. 1. In such an embodiment, the message is received via communication device 128. In one embodiment, the received message is stored in RAM 106.

Referring now to step 610 of FIG. 6, position is determined. More particularly, the server is operable to determine the position of the message transmission device using the PDS data contained in the position header. In the embodiment shown in FIG. 7, position is determined by PDS processor 703. In one embodiment, the determined position is expressed in Latitude and Longitude coordinates.

As shown by step 608 of FIG. 6, the server then generates a message that complies with any instructions included in the message received in step 607 and that indicates the position determined in step 610 (hereinafter the "second message"). The indication of the position determined in step 610 can be in a format indicated by any instruction included in the message received in step 607. That is, for example, if an instruction is received indicating that position is to be indicated as a street address, the determined position is indicated as the street address of the determined position.

As shown in step 609 of FIG. 6, the second message is then transmitted by the server. The transmission of the second message complies with any instruction received in step 607. Thus, for example, if an instruction is received indicating a particular routing, the message is routed pursuant to the indicated routing.

Figure 7:
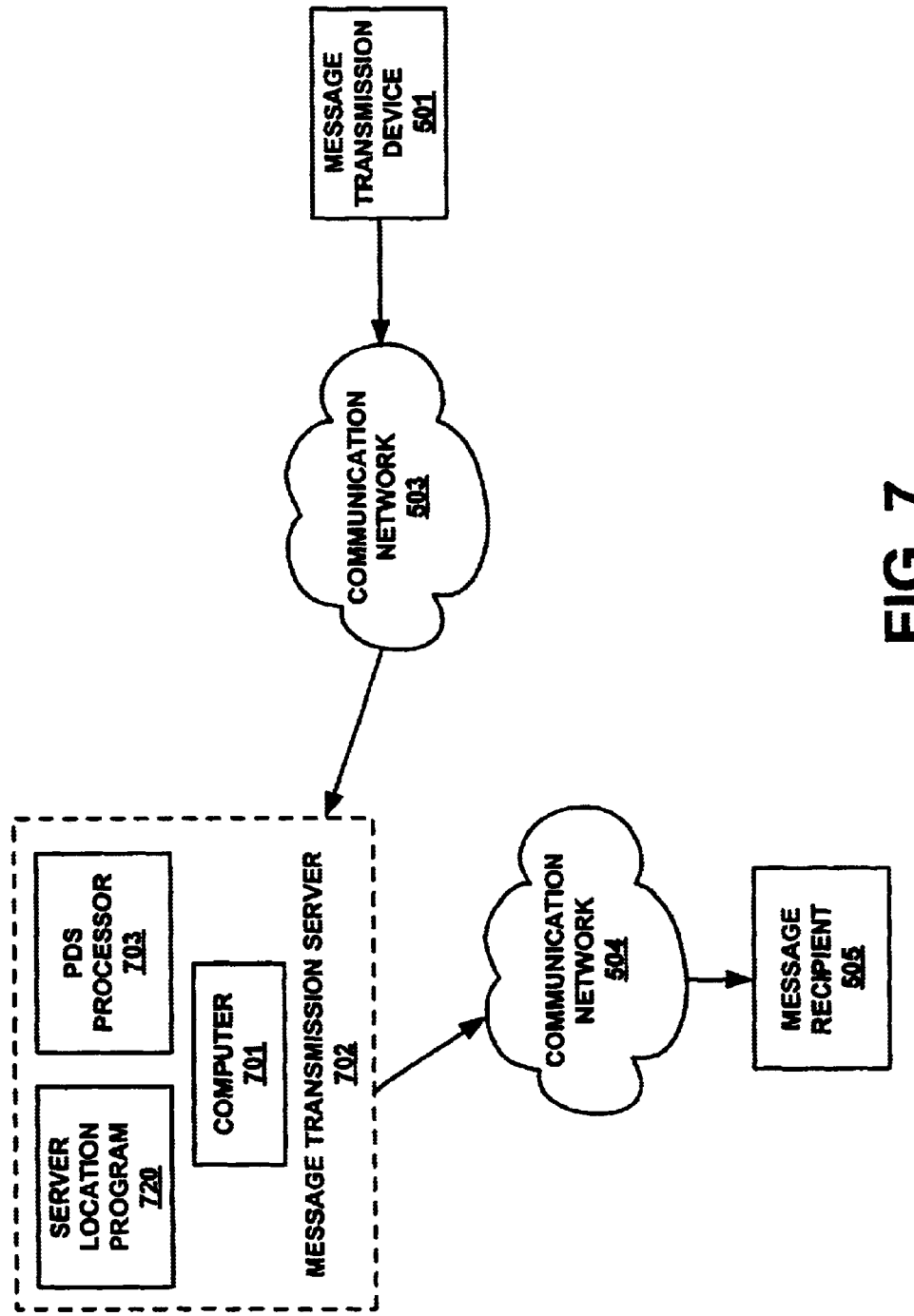
FIG. 7 is a diagram illustrating the transmission of a message that indicates position from a message transmission device that does not include PDS processing capabilities to a message recipient in accordance with one embodiment of the present claimed invention.

FIG. 7 illustrates an exemplary embodiment for transmitting a message from a message transmission system 501 to a message recipient 505 using a message transmission server 702. In one embodiment, message transmission server 702 includes a PDS processor 703. In one embodiment, PDS processor is a GPS processor implemented on a circuit board that includes a dedicated microprocessor for calculating position. Alternatively, PDS processor 703 is a software program that runs on computer 701.

Continuing with FIG. 7, in one embodiment, message transmission server 702 includes a computer 701 that is identical to computer system 100 of FIG. 1 and that is adapted to route messages formatted in the SMTP format. Server location program 720 is operable on computer 701 for performing steps of the present invention. In one embodiment, message transmission server 702 also includes a commercially available SMTP routing program (not shown) that operates in conjunction with server location program 720 for routing SMTP formatted messages.

Message transmission server 702 is coupled to message transmission system 501 via communication network 503 and is coupled to message recipient 505 via communication network 504. Communication network 503 can be identical to communication network 504 or may be an entirely different network.

In operation, when the embodiment shown in FIG. 7 is used to send a message from a message transmission system 501 to a message recipient 505, using the method described in flow chart 660 of FIG. 6, message transmission system 501 is used to generate a message as shown in steps 401–402 of FIG. 6. The message includes a position header that includes PDS data pursuant to steps 604–605 of FIG. 6.

Continuing with FIG. 7, the message is routed to message transmission server 702 via communication network 503. PDS processor 703 then determines position of message transmission system 501 using the received PDS data. Server location program 720 then generates a second message that complies with the instructions in the received message and that indicates the calculated, position. The second message is then transmitted, via communication network 504 to message recipient 505.

The embodiment shown in Flow Chart 600 of FIG. 6 and illustrated in FIG. 7 does not require a message transmission device 505 that includes PDS processing capabilities. Thus, a message transmission device such as message transmission device 300 shown in FIG. 3 can be used. This results in significant cost savings as compared to the use of a device that includes a PDS processing capabilities. This also results in a smaller, lighter-weight message transmission device. In addition, there is no need to store databases in the message transmission device for conversion of position into a desired format. This saves additional cost as there is no need for extensive memory storage capacity and there is no need for constantly updating a database on each message transmission device.

By using a server for calculating position and for converting the determined position into a desired format, updating and maintaining the necessary databases is simplified. That is, instead of requiring databases on each message transmission device, only a few, centrally accessible databases are required for servicing many message transmission systems. This simplifies database updating because only the databases on each server need to be updated.

In one embodiment, the invention of FIGS. 1–7 is used in conjunction with a computer system on which a browser program is operating. In one embodiment, a browser program such as, for example, Netscape Navigator, Microsoft Explorer, etc. is used. A cookie is created that includes position information. The cookie is stored in files that are accessible through the browser program. In one embodiment, the cookie is created by an internet server, with the cookie having provision for insertion of position information. Alternatively, a dedicated cookie is created by the user's computer that indicates position and that is accessible by various internet servers. The cookie is periodically updated such that the cookie indicates the position of the user. In one embodiment, a location program such as location program 211 shown in FIG. 2 is used to create and update position information within one or more cookies. In another embodiment, a cookie altering protocol is used that is operable by the web browser to store position data in one or more cookies. In one embodiment, the cookie altering protocol is an applet written in the Java programming language that is stored in an extensions file for operation by the web browser.

In an embodiment in which cookies are used that include an indication of position, internet servers can access the user's position when the user logs on to a designated site over the internet. The position information can be used to deliver position relevant data to the user. In one embodiment, updated map data is made available to the user based on the user's position as indicated in the cookie. Alternatively, a provider of a service such as, for example a restaurant or a gas station can provide information relating to nearby facilities based upon the position information in the user's cookie.

FIG. 8 shows examples of instructions that relate to position. As shown by blocks 801–805, the instruction can indicate that a return message is to be sent to the sender that includes a determination of position in a desired format or reference system. The indication of position can be expressed in Latitude and Longitude coordinates as shown by block 801, as street name and nearest cross street as shown by block 802, as a nearest street address as shown by block 803, in WGS84 coordinates as shown by block 804, or in map coordinates as shown by block 805.

By using the instructions shown in blocks 801–805 of FIG. 8, a person using a message transmission system can obtain their current position in any of a number of different desired formats and/or reference systems using a simple and inexpensive message transmission system. That is, the message transmission system does not have to have an extensive database as is required by prior art systems for determining position. In fact, the message transmission system does not even need to have PDS processing capabilities.

Continuing with FIG. 8, when a desired recipient is indicated in a message, hereinafter referred to as the "addressee," the message is routed to the addressee. That is, the message includes routing information that indicates an intended addressee. Blocks 806–810 show exemplary instructions that are operable to send a message to an addressee. The indication of position can be expressed in Latitude and Longitude coordinates as shown by block 806, as street name and nearest cross street as shown by block 807, as a nearest street address as shown by block 808, in WGS84 coordinates as shown by block 809, or in map coordinates as shown by block 810.

In one embodiment, the message is routed according to the user's position. That is, the message is not routed to a specific address, but rather, the message is routed according to the user's position. Thus, for example, a message can be routed to the nearest facility, server, or service provider. In the example shown in block 811 of FIG. 8, an instruction that indicates routing causes the message to be routed to a designated service provider's facility that is near the user's position.

Still referring to FIG. 8, block 812 shows an exemplary instruction that is operable to send a formatted message. Such formatted messages are similar to form letters, with relevant information automatically inserted into the body of the form. The instruction shown in block 813, generates a formatted message that is automatically routed to the nearest facility of a service provider according to the user's position. An example is an instruction in a message that indicates that the user's vehicle is out of gas and that assistance is needed. In response to this instruction, a form-message is generated that indicates the sender's current position and that requests that a vehicle be dispatched immediately to provide gas to the stranded motorist. The form-message is automatically routed to the service station that is nearest to the sender's current position. The indication of position can be in any of a number of different formats such as, for example, Latitude and Longitude coordinates, street name and nearest cross street, a nearest street address, in WGS84 coordinates, or in map coordinates.

Continuing with FIG. 8, block 814 shows an exemplary instruction that is operable to send a query to a service provider. Such an instruction may take the form of a name of a service provider followed by a question mark. A response would be sent to the sender indicating the location of the nearest service provider location. For example, a query of "Wells Fargo?" generates a response that indicates the location of the Wells Fargo branch nearest the sender's current position. The response could also indicate directions for travelling from the sender's current position to the desired service provider's location.

Continuing with FIG. 8, block 815 shows an exemplary instruction that is operable to send a message that instructs that a task is to be performed that relates to position.

Continuing with FIG. 8, block 816 shows an exemplary instruction that is operable to send a message to an automated device that instructs that a task is to be performed when determined position meets designated criteria.

Continuing with FIG. 8, block 817 shows an exemplary instruction that is operable to send a message to an automated gate opening device instructing that the gate be opened when the determined position is near the gate.

Continuing with FIG. 8, block 818 shows an exemplary instruction that is operable to send a message to an alarm'system instructing that the alarm system be deactivated when the determined position is near the alarm system.

Still referring to FIG. 8, the given instructions are exemplary only, the apparatus and method of the present invention are well adapted for performing any of a number of instructions that relate to position. For example, because PDS signals typically include an indication of time and date, the second message can include the time and/or date indicated by the received PDS signals.

Any of a number of different methods for indicating text in a message as an instruction can be used. In one embodiment, all text that is contained between star symbols is interpreted as an instruction.

Similarly, any of a number of different methods for indicating routing can be used. In one embodiment, a user indicates return routing (blocks 801–805) by typing "self"
into the space designating the recipient's name (e.g. "TO: self"). Alternatively, a word, numeral, or letter in the instruction indicates routing (e.g. "R" for return routing). In one embodiment, for example, the letter "A" indicates automated routing to the nearest service provider (block 811).

The indication of position can be either placed at the beginning or end of the message, or can be inserted into the text of the message in place of the instruction. In an embodiment in which the letter R indicates return routing, for example, the phrase *R4D*, if written into the text of a message would be interpreted as instruction "R4D". In one embodiment, the instruction R4D indicates that a return message is to be transmitted to the sender that includes, in place of the phrase *4D* in the text of the message, the user's position as a street address.

In one embodiment, when there is no indication of return routing or automated routing, the message is sent to the indicated addressee. An example of such a message would be a message "TO: John Doe" that includes the phrase *4D* in the text of the message. This indicates that a message is to be generated and sent to "John Doe" that indicates the user's position as a street address, with the user's position inserted into the text of the message in place of the phrase *4D*. An example of such a message is "Please pick me up immediately, I am at *4D*. In operation, such a message would cause the SMTP server to generate and transmit a message to John Doe that includes, for example, the text "Please pick me up immediately, I am at 1314 Smith Avenue, San Jose, Calif.

The method and apparatus of the present invention allows for a scalable system of message transmission servers and message transmission systems. A single SMTP server can service hundreds and possibly thousands of message transmission devices. This allows for efficient maintenance and updating of databases since only databases in SMTP servers need be updated as opposed to prior art systems that require databases in each device that is used to determine position. This results in significant cost savings as compared to prior art systems.

In the example shown by block 819 of FIG. 8, a message is sent and is routed according to the determined position and according to the indicated addressee. In one embodiment, routing is accomplished by modifying the "to header" such that the message is routed to the nearest facility of a particular addressee.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A method for sending a message that indicates position comprising:

a) receiving a first message from a remote message transmission device utilizing a computer, said first message including a determined position and an instruction that relates to position;

b) generating a second message that complies with said instruction and that indicates said determined position; and c) transmitting said second message via a communication network utilizing said computer.

2. A method for sending a message that indicates position according to claim 1 wherein, when said instruction indicates routing, said second message is routed according to said instruction.

3. A method for sending a message that indicates position according to claim 1 wherein, when said instruction indicates return routing, said second message is transmitted back to said message transmission device utilizing said computer.

4. A method for sending a message that indicates position according to claim 1 wherein, when said instruction indicates transmission to a service provider, said second message is sent to said service provider, said message indicating said instruction and indicating said determined position.

5. A method for sending a message that indicates position according to claim 1 wherein, when said instruction is a query, said second message indicates a response to said query.

6. A method for sending a message that indicates position according to claim 1 wherein, when said instruction indicates that a task is to be performed that relates to said determined position, said second message operates to instruct the performance of said task.

7. A method for sending a message that indicates position according to claim 1 wherein, when said instruction indicates that a task is to be performed by an automated device, said second message operates to instruct said automated device to perform said task when said determined position meets a predetermined criterion.

8. A method for sending a message that indicates position according to claim 7 wherein, when said instruction indicates that a gate is to be opened, said second message instructs operating circuitry coupled to said gate to open said gate when said determined position is near said gate.

9. A method for sending a message that indicates position according to claim 7 wherein, when said instruction indicates that an alarm system is to be turned off, said second message instructs operating circuitry coupled to said alarm system to turn off said alarm system when said determined position is near said alarm system.

10. A method for sending a message that indicates position according to claim 1 wherein said message is formatted in a Standard Mail Transmission Protocol (SMTP) format having a body and a header, said instruction indicated in said body and said determined position indicated in said header.

11. A method for sending a message that indicates position according to claim 10 wherein, when said instruction indicates the insertion of said determined position in a particular format into the body of said first message, the determined position is converted into the designated format and is inserted into the body of said message.

12. A method for sending a message that indicates position comprising:
 a) receiving a first message from a remote message transmission device utilizing a computer, said first message includes position determination system data and an instruction that relates to position;
 b) determining the position indicated by said position determination system data;
 c) generating a second message that complies with said instruction and that indicates said determined position; and
 d) transmitting said second message via a communication network utilizing said computer.

13. A method for sending a message that indicates position according to claim 12 wherein, when said instruction indicates routing, said second message is routed according to said instruction.

14. A method for sending a message that indicates position according to claim 12 wherein, when said instruction indicates return routing, said second message is transmitted back to said message transmission device utilizing said computer.

15. A method for sending a message that indicates position according to claim 12 wherein, when said instruction indicates transmission to a service provider, said second message is sent to said service provider, said message indicating said instruction and indicating said determined position.

16. A method for sending a message that indicates position according to claim 12 wherein, when said instruction is a query, said second message indicates a response to said query.

17. A method for sending a message that indicates position according to claim 12 wherein, when said instruction indicates that a task is to be performed that relates to said determined position, said second message operates to instruct the performance of said task.

18. A method for sending a message that indicates position according to claim 12 wherein said position determination system data indicates time, and wherein said second message indicates time.

19. A method for sending a message that indicates position according to claim 12 wherein said position determination system data indicates date, and wherein said second message indicates date.

20. A method for sending a message that indicates position from a remote message transmission device that is adapted to transmit a message that includes a body and a header, said remote message transmission device including a position determination system receiver adapted to receive position determination system signals, said method comprising:
 a) generating a message at said remote message transmission device that includes a body and at least one header;
 b) receiving position determination system signals containing position determination system data at said position determination system receiver;
 c) generating a position header that includes said position determination system data; and
 d) inserting said position header into said message.

21. A method for sending a message that indicates position from a message transmission device according to claim 20 wherein said message includes an instruction that relates to position.

22. In a computer system having a processor coupled to a bus, a computer readable medium coupled to said bus and having stored therein a computer program that when executed by said processor causes said computer system to implement a method for sending a message that indicates position of a remote message transmission device, said method comprising:
 a) generating a message at said remote message transmission device that includes a body and at least one header;
 b) receiving position determination system signals containing position determination system data at a position determination system receiver;
 c) generating a position header that includes said position determination system data; and
 d) inserting said position header into said message.

23. A computer readable medium according to claim 22 wherein said message includes an instruction that relates to position.

24. A computer implemented method of sending a message, said computer implemented method comprising:
- a) generating a message at a remote message transmission device that includes a body and at least one header;
- b) receiving position determination system signals containing position determination system data at a position determination system receiver;
- c) generating a position header that includes said position determination system data; and
- d) inserting said position header into said message.

25. A computer implemented method for sending a message that indicates position according to claim 24 wherein said message includes an instruction that relates to position.

26. A method for sending a message that indicates position from a remote message transmission device that is adapted to transmit a message that includes a body and a header, said message transmission device including a position determination system receiver adapted to receive position determination system signals, said method comprising:
- a) generating a message that includes a body and at least one header;
- b) receiving position determination system signals containing position determination system data;
- c) determining position using said position determination system data;
- d) generating a position header that includes said determined position; and
- e) inserting said position header into said message.

27. A method for sending a message that indicates from a message transmission device according to claim 26 wherein said message includes an instruction that relates to position.

28. In a computer system having a processor coupled to a bus, a computer readable medium coupled to said bus and having stored therein a computer program that when executed by said processor causes said computer system to implement a method for sending a message that indicates position, said method comprising:
- a) generating a message that includes a body and at least one header;
- b) receiving position determination system signals containing position determination system data;
- c) determining position using said position determination system data;
- d) generating a position header that includes said determined position; and
- e) inserting said position header into said message.

29. A computer readable medium according to claim 28 wherein said message includes an instruction that relates to position.

30. A computer implemented method of sending a message, said computer implemented method comprising:
- a) generating a message that includes a body and at least one header;
- b) receiving position determination system signals containing position determination system data;
- c) determining position using said position determination system data;
- d) generating a position header that includes said determined position; and
- e) inserting said position header into said message.

31. A computer implemented method for sending a message that indicates position according to claim 30 wherein said message includes an instruction that relates to position.

32. A computer implemented method for indicating position, said computer implemented method comprising:
- a) storing a cookie on a computing device that is adapted to be coupled to the internet;
- b) receiving position determination system signals containing position determination system data;
- c) determining position using said position determination system data; and
- d) modifying said cookie such that said cookie indicates said determined position.

* * * * *